United States Patent [19]

Chase et al.

[11] Patent Number: 6,094,671
[45] Date of Patent: Jul. 25, 2000

[54] AGGREGATE INFORMATION PRODUCTION AND DISPLAY SYSTEM

[75] Inventors: Timothy Chase, Holmdel; Don Gobin, Fords, both of N.J.

[73] Assignee: Starguide Digital Networks, Inc., Reno, Nev.

[21] Appl. No.: 08/947,967

[22] Filed: Oct. 9, 1997

Related U.S. Application Data

[60] Provisional application No. 60/027,903, Oct. 9, 1996.
[51] Int. Cl.$^7$ .................................................. G06F 17/30
[52] U.S. Cl. .......................... 709/201; 709/203; 707/512
[58] Field of Search ..................................... 709/105, 106, 709/107, 201, 203; 345/328; 707/200, 501, 502; 380/20; 704/5

[56] References Cited

U.S. PATENT DOCUMENTS

| | | | |
|---|---|---|---|
| 5,305,440 | 4/1994 | Morgan et al. | 395/200 |
| 5,594,490 | 1/1997 | Dawson et al. | 348/6 |
| 5,694,546 | 12/1997 | Reisman | 395/200.9 |
| 5,727,002 | 3/1998 | Miller et al. | 371/32 |
| 5,732,216 | 3/1998 | Logan et al. | 709/106 |
| 5,737,739 | 4/1998 | Shirley et al. | 707/512 |
| 5,781,909 | 7/1998 | Logan et al. | 707/200 |
| 5,818,441 | 10/1998 | Throchmorton et al. | 345/328 |
| 5,828,839 | 10/1998 | Moncreiff | 709/107 |
| 5,838,906 | 11/1998 | Doyle et al. | 709/105 |
| 5,848,386 | 12/1998 | Motoyama | 704/5 |
| 5,862,325 | 1/1999 | Reed et al. | 709/201 |
| 5,894,554 | 4/1999 | Lowery et al. | 709/203 |
| 5,956,483 | 9/1999 | Grate et al. | 709/203 |
| 5,987,480 | 11/1999 | Donohue et al. | 707/501 |

OTHER PUBLICATIONS

StarGuide Ditial Networks, Inc., "Installation and Operaton of the DaX," Apr. 25, 1995 pp. 1–16.

*Primary Examiner*—Frank J. Asta
*Assistant Examiner*—Thong Vu
*Attorney, Agent, or Firm*—McAndrews, Held & Malloy, Ltd.; Robert C. Ryan

[57] ABSTRACT

A production system for packaging aggregates of mixed media information (e.g. text, images, audio, and video) into addressable packets which are transmitted to receivers over a satellite network, with the information aggregates (IA's) displayed and arranged for use via an associated Hypertext Markup Language (HTML) file, or other such displays language file and associated interpreter. The HTML file, when interpreted and displayed, would provide an organized and easy to access presentation of the mixed-media files transmitted over the satellite network, whereby textual and graphic descriptions could be used to describe the file contends and HTML buttons would allow playback and/or viewing of the linked file information. The HTML file might also include a link to communications software for enabling data dialog with a site external to the receiving station. One example link would include software for a telephone connection. This connection could direct the transmission source station to send more information, as needed. Still other links would allow software stored locally at the receiving station to be accessed and used. A link might also be provided via the internet to external URL addresses. The IA groups and packets would also be useful for distributed, distant teaching systems, with feedback from the receiving sites provided through the communications link to the source station.

50 Claims, 6 Drawing Sheets

Microfiche Appendix Included
(19 Microfiche, 98 Pages)

AGGREGATE INFORMATION PRODUCTION AND DISPLAY SYSTEM

CROSS-REFERENCE TO RELATED APPLICATIONS

This application is a non-provisional application claiming priority of provisional application U.S. Ser. No. 60/027,903, filed Oct. 9, 1996.

STATEMENT REGARDING FEDERALLY SPONSORED RESEARCH OR DEVELOPMENT

Not Applicable

BACKGROUND OF THE INVENTION

The software files utilized to implement the preferred embodiment of the present invention are provided in printed form and are attached as microfiche Appendices A, B and C comprising 1862 frames. This software is used to implement the invention on equipment available from Starguide, Inc., of Reno, Nev. This software directly corresponds to software submitted on Disks A, B and C of the parent application.

The software and technology presented herein is a further improvement of the technology disclosed in the Applicant's co-pending application "Audio File Distribution and Production System," filed Sep. 1, 1995 as a provisional provisional application, Ser. No. 60/003,164; and file on Aug. 30, 1996.

All of the software appendices A, B, and C referenced above, along with the above-referenced papers—provisional and non-provisional applications along with their referenced incorporations and appendices—are expressly incorporated herein by reference in their entireties.

This invention relates to a software production system for packaging aggregates of information into addressable packets which are transmitted to receivers over a satellite network, with the information aggregates (IA's) displayed and arranged for use via an associated Hypertext Markup Language (HTML) file, or other such display language file and interpreter. The HTML file would include a link to software for providing a low-cost communication link from the receiving station (or stations) back to the transmitting station. An example low-cost (and consequently low throughput) link would include a software link for telephoning and, for instance, directing the transmission source station to send more information as needed. This telephone linkup might also connect to other external telephonic sources. Alternatively, other low-cost links might be used to remedy asymmetrical data link problems existing between satellite transmission and receiving stations.

Satellite networks are used to transmit large quantities of information from a transmission station to an orbiting satellite which relays the transmission back down to a variety of receiving stations. Such digital information can include, for example, text, photographs, audio, video, and/or animation. While satellite transmission has been recognized as an efficient method for distributing such diverse information, organization of such varied media has presented problems. Generally a receiver of such varied media must sort out and discern the purpose of each file and the requisite playback or viewing tool to use with each particular file. Thus, while a user may receive a file or group of files over the satellite transmission network, follow-up printed documentation, or even a live representative, must often arrive separately in order to explain and organize the files sent. This is because satellite receivers are generally one-way data collection systems, and generally cannot send information via satellite back to the transmitting station. While separate satellite transmitters might exist at a receiver station, this is generally an expensive communication method and requires the extra satellite transmission hardware and related upkeep.

Accordingly, companies such as SONY NETWORKS, or TM CENTURY, will send audio information and other such files to satellite receiving stations which are owned and/or controlled by entities such as radio or television stations. The receiving station might be a subscriber of the above mentioned companies' services, or the transmitting company may be trying to solicit new business. In either instance, the receiving station has been designated to receive downloaded information in the form of computer files which might include, for instance, sound bytes from a new record, or sound effects for possible use on a radio show, or video clips for use on the news. In the past, such files have been downloaded and identified by letter/number identifiers typically associated with the naming of each file on the computer's operating system. The user must then sort through and organize the various information, categorizing the source of the downloaded information, the playback media, and the topic to which it relates. For a radio or television station that constantly receives information, this organizational problem is greatly compounded.

Methods and computer languages exist which are designed to organize, display, and link together information from a variety of different playback and display media. One such language is Hypertext Markup Language (HTML) which is used to display "web pages" on the internet. This language, however, has not been used to organize and display different types of media information transmitted over a satellite network to receiving stations. An HTML page can therefore be developed to identify and link together various media files which have been transmitted with the HTML page, or are known to exist on the receiving station's computer storage medium. Organization of the files is thereby provided by textual or graphical orientation of the HTML page, or pages. The various media files can then be conveniently accessed via clicking on a button or textual area which has been linked to the file.

Accordingly, what is needed in the field is a system which will produce organized information groups and packets for the transmission and display of satellite information consisting of aggregate media files which are transmitted to a receiving station. An HTML page, for instance, might provide links to files which are transmitted with the page. The HTML page might also provide links to playback software (e.g. MUSICAM) and/or other files already associated with the receiving station. The HTML page might alternatively provide a software link to a telephone connection which could provide data dialog with an external site. The telephone connection might be used to call the satellite transmission station to further direct the transmission source to transmit more and/or different information to the receiving station, or to a group of stations.

BRIEF SUMMARY OF THE INVENTION

The present invention provides a satellite production and display system, and associated software, for organizing various pieces of information into an information aggregate (IA) group and IA packet which are then transmitted and received over a satellite network. Such IA packets would be generated by "producer" stations or terminals. The IA group consists of an HTML page or pages, along with associated media files which are referenced and linked by, for instance, HTML page. An IA packet consists of an IA group which has been "packaged" for delivery to a particular satellite receiver destination, or a collection of satellite receivers. Such receiving stations can be dynamically grouped and re-grouped according, for instance, to their nature (e.g. sports radio stations) and/or data needs. The HTML page, when interpreted by the receiving station, would present textual and/or graphical explanations of the data that has been sent with transmission. The user might then use a pointing device, such as a mouse, to "click-on" or choose a particular audio, video, picture, or text file that is associated, or linked, with the HTML page.

This information production and display system thereby allows a producer station to carefully generate, organize, and/or choreograph the presentation of a set of media files to be transmitted to a receiving satellite station. For example, the producer user's distinctive logo might appear prominently across the top of the page. Animated text or graphical characters might be added for emphasis, as desired. The producer might then graphically or textually describe each audio, video, or pictorial clip which has been sent with the HTML page and provide an associated mouse button. The user can scan down the HTML page and hear or view only those items of interest. For instance, a record company might transmit promotional about an upcoming album to be released by a particular artist. Information about the album and album cover could be graphically displayed to a receiver such as a radio station. Below the cover, different album tracks could be textually described with an associated HTML mouse button for access and playback of that particular album track, or portion thereof, which is located in an associated audio file.

In yet another example, an advertiser might send a commercial spot to a radio or television station, but would provide specific instructions (e.g. textual, audio, video) on when and how the commercial is to be played. For instance, certain commercials are only suited for certain times of day. Other commercials should not be played directly before or after a competitor's advertisement. The present system would allow, for example, a convenient method for organizing and presenting such instructions, and would also allow the receiving station to conveniently preview the material by clicking on a mouse button linked to the audio or video file.

In still another example, a company which sells sound bytes, sound effects, or video clips to subscriber stations could organize the clips with a textual description of each clip. The receiving station could then quickly scan through and sample the material sent in deciding whether to use or purchase the material from that particular producer of the IA group and packet.

In the present embodiment, the HTML page has specially created software links which use MUSICAM software for playing such audio clips. MUSICAM is a registered trademark of Corporate Computer Systems (CCS), Inc. which is a subsidiary of Starguide Digital networks, Inc. Such MUSICAM software, as copyrighted and available from CCS and Starguide provides much more dynamic and accurate playback quality than conventional computer playback methods. Such MUSICAM software would reside in memory at each local receiving station instead of being downloaded repeatedly. Other such software players or viewers for audio, pictorial, and video files could similarly be stored and linked for rapid playback of any file type by the receiving station.

Internet "web page" applications using HTML typically link one web page to yet another web page through connection to a universal resource locator or URL address. Such URL's contain the next picture, page, or text to be downloaded according to the web page's HTML instructions. As one option, the present application might also provide such URL links to internet locations via a telephone connection to the internet.

More importantly, the HTML page of the present invention would provide a software connection to a low-cost communication medium whereby external sites—such as the source transmission station—could be contacted and a dialog when ensue. Low-cost links generally imply a lower throughput than satellite transmission rates. However, what is needed is some connection between receiving station and, for example, the transmitting station, which is convenient to use, low-cost to acquire, and low-cost to operate. While the present invention embodies the use of any such low-cost link as implemented using a variety of data transfer techniques, the following example details the use of a telephone as one such convenient, low-cost data link.

Hence, a telephonic linkup could be used to contact any of a number of sites external to the receiving station. One such telephone linkup would include calls directed back to the satellite transmission source. The satellite transmissions, in this case, are one-way broadcast transmissions from a source station to a receiving station or group of stations. While permitting relatively high throughputs of data to be transmitted to a vast number of receiving stations, there generally exists no low-cost and convenient feedback mechanism from the receiver station back to the transmitting station. Such a telephone linkup would provide a low throughput, yet inexpensive feedback connection between the receiving and the transmitting station. A low-level data dialog could exist thereby facilitating a request for the transmission of new, or different, data to the receiving unit. Alternatively, such a data link might, for example, facilitate registration of a user as a new subscriber to a data service, or confirm a user's acceptance of the most recently sent materials from such a data service.

The present invention would also prove to be extremely useful with distributed teaching systems whereby teaching or instructional materials are distributed from a central location to various remote locations. In one instance, a training manual with linked textual, audio, and video portions could be transmitted to many remote receiving stations. Alternatively still, one receiving station might receive the training material and distribute it for viewing via a LAN network. Furthermore, "live" training sessions with intermixed audio and video portions could be centrally distributed. The low throughput phone feedback might then be used for student feedback or questions with the teacher thereby interactively serving many remote locations and students. The training manual and associated software might also automatically sense the training "path" taken by the user, and transmit a request for the next set of informational data needed to proceed through a training session.

Accordingly, it is an object of the present invention to provide an information production and display system, and related software, to facilitate the organized satellite transmission, reception, display and access of information aggregates consisting of media data and files.

It is still another object of the present invention to provide production, or producer, software for the creation of HTML pages with linked media files for transmission over a satellite network to receiving stations.

It is yet another object of the present invention to provide for production of HTML pages with linked media files for transmission over a satellite network to receiving stations, with HTML links to MUSICAM software located at the receiving station for playback of audio files.

It is still another object of the present invention to provide for production of HTML pages with linked media files for transmission over a satellite network to receiving stations, with HTML links to software stored at the receiving station for performing local actions.

Yet another object of the present invention is to provide for production of HTML page with linked media files for transmission over a satellite network to receiving stations, with HTML links to software for establishing an external data link connection.

Still another object of the present invention is to provide for production of HTML pages with linked media files for transmission over a satellite network to receiving stations, with HTML links to software for establishing an external data link connection such a telephonic connection.

It is a further object of the present invention to provide for production of HTML pages with linked media files for transmission over a satellite network to receiving stations, with HTML links to software for establishing an external connection such as a telephonic connection, with the telephone connection being made to the transmission source station to further direct future transmissions.

It is a yet another object of the present invention to provide production of HTML pages with linked media files for transmission over a satellite network to receiving stations, with the pages serving as distributed training materials.

It is a still another object of the present invention to provide for production of HTML pages with linked media files for transmission over a satellite network to receiving stations, with the pages serving as distributed training materials, with HTML links to software for establishing an external connection such as a telephone connection to the transmission source, the training session thereby being interactive.

Other objects and advantages of this invention will become apparent from the following description taken in conjunction with the accompanying drawings wherein are set forth, by way of illustration and example, certain embodiments of this specification and include exemplary embodiments of the present invention and illustrate various objects and features thereof.

DETAILED DESCRIPTION OF THE INVENTION

Figure 1:
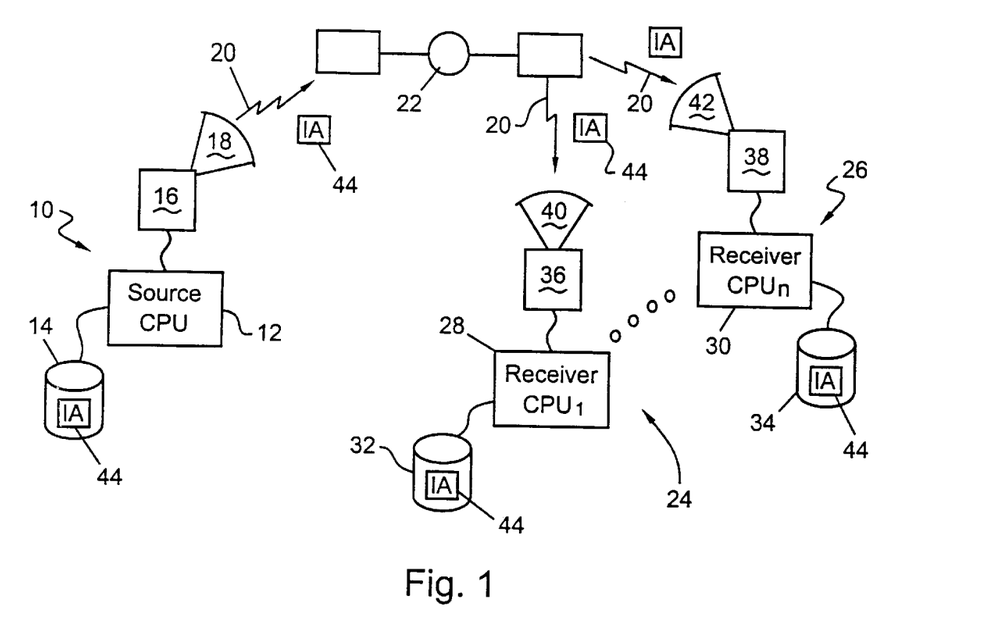
FIG. 1 shows a block diagram for transmitting an information aggregate (IA) packet from a satellite transmission station source computer to a plurality of satellite receiver station computers 1 through n via a satellite relay.

Referring now to FIG. 1, a block diagram of a satellite transmission network is shown. A satellite transmission system 10 is shown comprised of a source central processing unit (CPU) 12 which is connected to a memory storage means 14, typically a high density disk drive unit. The transmission system includes a transmitter 16 and a satellite transmission antenna 18. The antenna 18 sends a signal 20 to an orbiting satellite 22. The satellite 22 relays the signal 20 to an orbiting satellite 22. The satellite 22 relays the signal 20 to one of many, e.g. 1 through n, satellite receiving stations 24, 26. Each receiving station has a receiver CPU 28, 30; a corresponding disk drive unit 32, 34; a corresponding receiver 36, 38; and satellite signal receiving antenna 40, 42. As shown in this diagram, the information aggregate (IA) packet 44, described below, is transmitted from the disk drive 14 of the source station 10 to the plurality of receiving stations 24, 26 and subsequently stored on the receiving station disk drives 32, 34. Each packet 44 is structured to contain information on its intended satellite receiver destination. Accordingly, packets can be selectively sent to a large group of receiving stations, e.g. only radio stations with an "all news" format. Alternatively, a packet 44 might be structured to be sent to only one particular receiving station, e.g. CBS news in New York.

Figure 2:
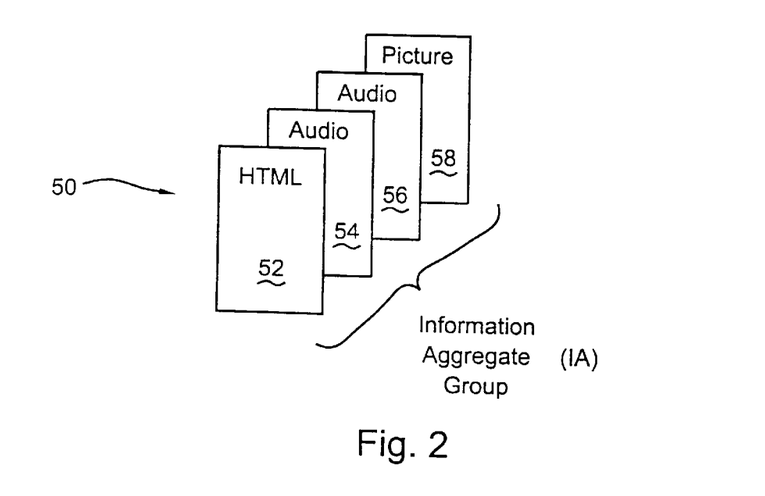
FIG. 2 shows a block diagram of an information aggregate (IA) group as made up of an HTML page which displays and organizes the linked audio and picture files.

Referring now to FIG. 2, an information aggregate group 50 is shown which is comprised of a Hypertext Markup Language (HTML) organizational page or file 52, with an associated audio file 54, another associated audio file 56, and an associated picture file 58. The information aggregate might consist of any such combination of media files including, but not limited to text, audio, video, program, and animation files.

Figure 3:
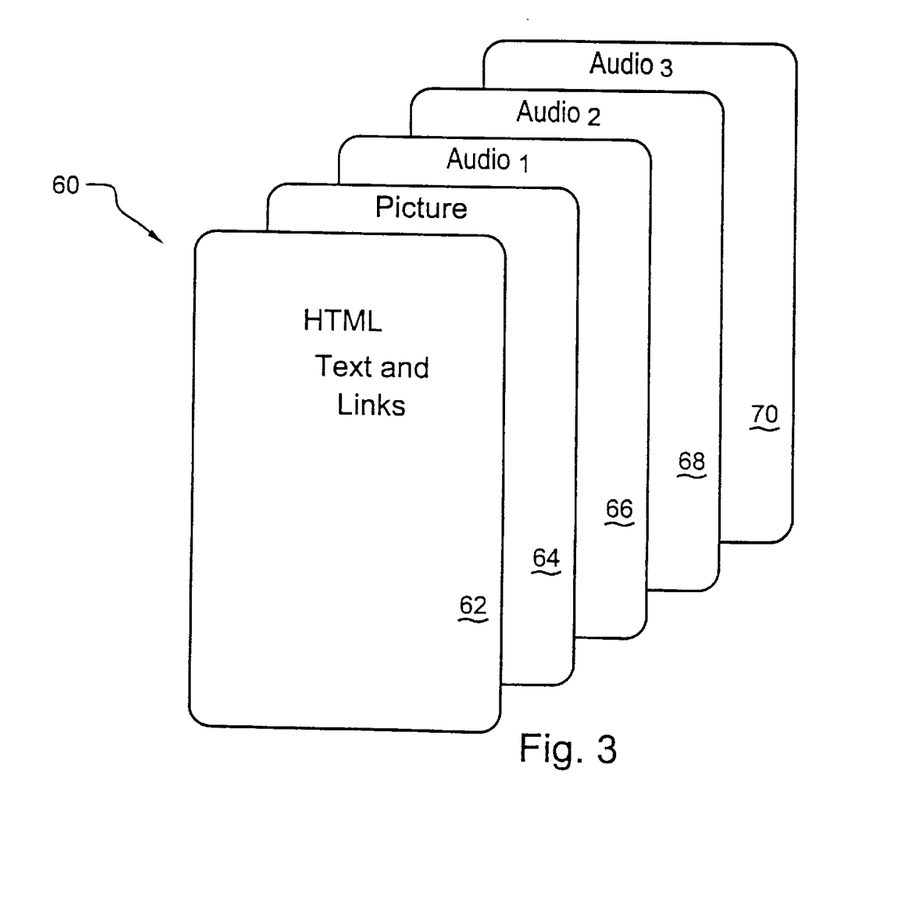
FIG. 3 shows a block diagram of another example information aggregate consisting of a record promotional page.

Referring now to FIG. 3, a more detailed example of an information aggregate group 60 is shown. In this example, a record company has created a promotional sheet for a new record by a particular artist. When the HTML file 62 is interpreted and displayed the result will appear like the display page 61 with the text and graphical boxes appropriately placed. The company has placed their name and logo 72 across the top of the page 61. The picture file 64 is linked to appear at location 65. Text 67 describes the first audio track and HTML software "button" 69 links to and allows playback of the audio file 66. Similarly, text 73 and button 75 addresses and links the second audio file 68, and text 74 and button 76 addresses and links the third audio file. The IA group 60 thereby provides a convenient method for organizing a series of media files in a textual and graphical format which is aesthetically pleasing and easy to use.

Figure 4:
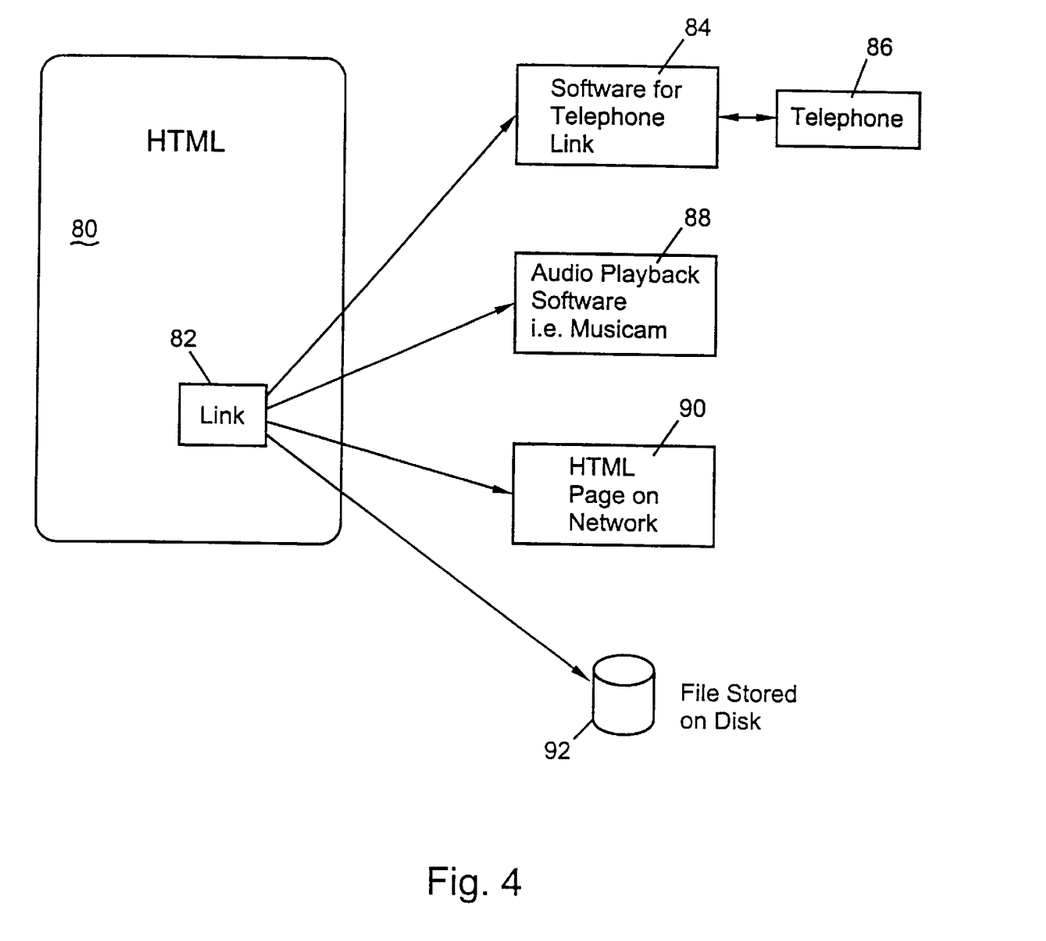
FIG. 4 shows a block diagram of an HTML page with example links to a software telephone link, MUSICAM playback software, an HTML internet page, or a file stored on the local receiver storage medium.

Referring now to FIG. 4, an additional example of an HTML page 80 is shown which might be used to organize media files into an IA group. In this example, the HTML link 82 is shown to access a variety of example linking options. The first option shows a link to software 84 which would provide an external telephone connection 86. The second option shows a link to audio playback software 88 which would include MUSICAM software which would reside in local memory 32, 34 of the receiver stations 24, 26 of FIG. 1. The third option shows a link to an HTML page 90 on the internet, via a telephone connection and standard related software (e.g. NETSCAPE). As similar to the second option, the fourth option shows the link accessing a file or software stored in local memory 92 of the receiving station (see also 32, 34 of FIG. 1). This file might be an audio or video file which is access frequently in many different applications, or a software program to perform a localized action at the receiving station.

Hence, while previous applications and uses of HTML have used the HTML linking capability to connect to URL addresses, e.g. addresses of other web pages and sites on the internet, the present invention teaches the use of HTML to link together and use software programs, digital files, and the link to organize, present, and use a variety of mixed media information. Accordingly, the options described for this particular link are for example purposes only; the preferred embodiment is not meant to be limited only to such example linking options, as many others options could be offered to facilitate organization of the transmitted media files and data.

Figure 5:
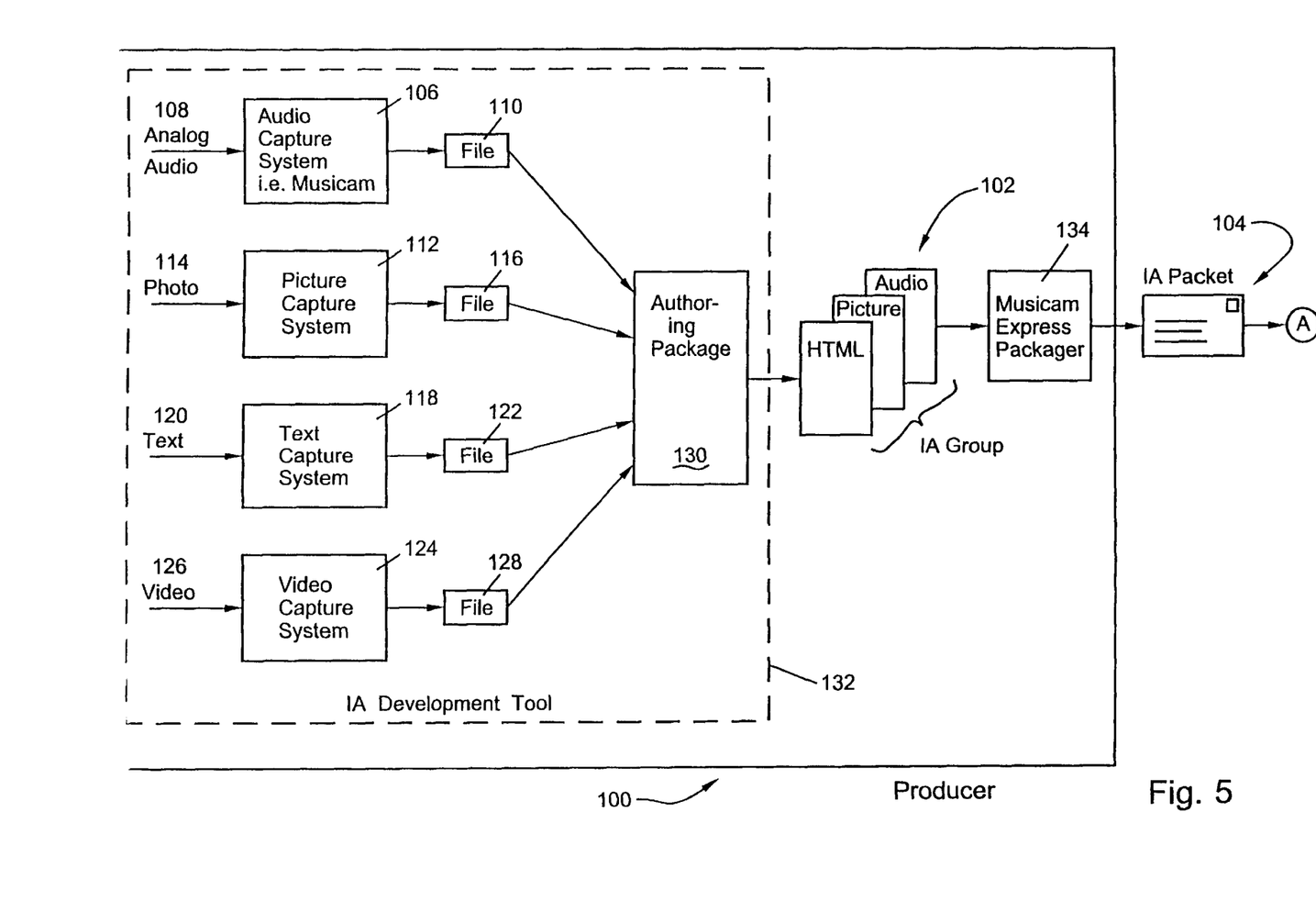
FIG. 5 shows a block diagram of the producer software for generating an IA packet.

Referring now to FIG. 5, a block diagram is shown of the "producer" software 100 for generating an IA group 100 and subsequent IA packet 102. For example purposes, the IA packet 102 has been depicted as a filled, addressed, and stamped envelope. This analogy is accurate in that the IA group 102 is packaged in a satellite transmittable format with an address tag and/or encoded key as to its receiver destination. The producer software 100 is thereby comprised of various capture systems for digitizing information into files to be grouped. In this example, an audio capture system 106 such as MUSICAM can be used to convert an analog audio signal 108 into a digital audio file 110. A photo or image capture system 112 such as a scanner can be used to convert a photograph or image 114 into a digitized image file 116 (e.g. a *.gif file). A text capture system 118 can be used to convert text 120 into digitized text file 122. Finally, a video capture system 124 can be used to convert a video segment 126 into a digitized video file 128. Other digital, animation, or program files might also be incorporated, as appropriate.

The files 110, 116, 122, and 128 are fed into an HTML authoring package 130. There are many such packages available, but the preferred embodiment uses MICROSOFT WORD with INTERNET ASSISTANT. This collection of capture systems 106, 112, 118, and 124, along with the authoring package 130 form an information aggregate (IA) development tool 132. This development tool 132 generates the above described IA group 102. A packager 134, such as that offered by MUSICAM EXPRESS, then takes the IA group 102 and creates the above described IA packet 104. As described in the above incorporated patent applications, the packager 134 would be part of a MUSICAM EXPRESS NETWORK comprised of numerous hubs and connected producers.

Figure 6:
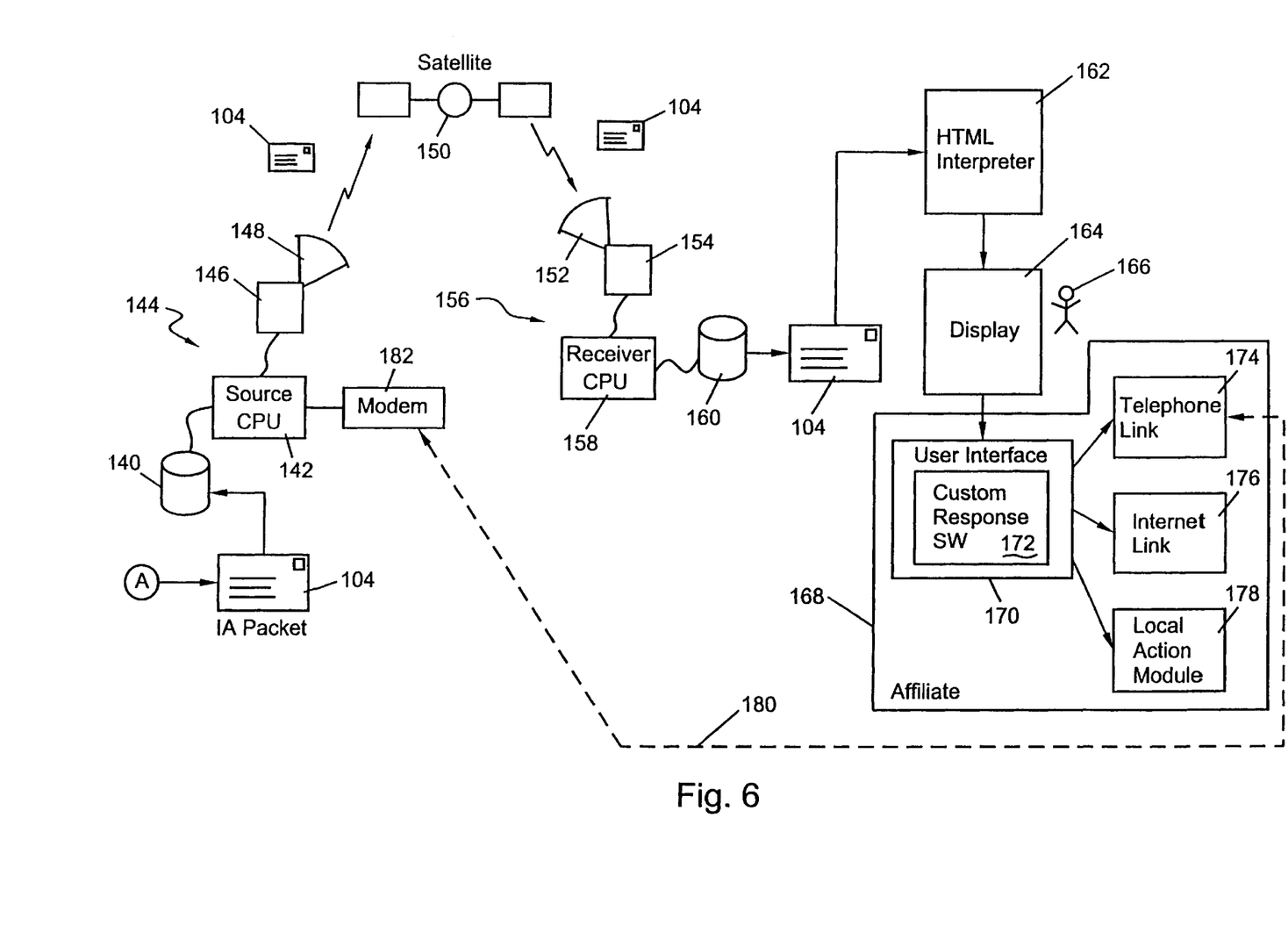
FIG. 6 shows a block diagram, as continued from FIG. 5, of the satellite network for transmitting and receiving the resulting IA packet, the HTML interpreter and display, and the affiliate software for facilitating links from the interpreted and displayed HTML page.

Referring also to FIG. 6, the block diagram of FIG. 5 is continued from point "A". In FIG. 6, the IA packet 104 is transferred and stored on the disk drive 140 which is connected to the source CPU 142 of the transmission station 144. The associated transmitter 146 and satellite antenna 148 is used to transmit the IA packet 104 to an orbiting satellite 150 which relays the IA packet 104 to an orbiting satellite 150 which relays the IA packet 104 information signal to an appropriate receiver antenna 152 and receiver 154 of the receiving station 156. The receiver CPU 158 processes and stores the received data in the receiver disk drive unit 160. An HTML interpreter 162 must next be used to interpret and display 164 the HTML page information and corresponding links with the associated files. The preferred embodiment uses a MICROSOFT HTML Interpreter plug-in to the receiver CPU 158.

In displaying and interacting with the HTML page, the user invokes the "affiliate" software 168. This software includes a user interface 170 which in turn runs custom response software 172. The response software 172 facilitates the various linking options exemplified in FIG. 4. As shown in this example, the user might choose between a telephone link 174, an internet link 176, or a local action module 178.

As noted above, an important feature of the present invention is the ability for the receiver station 156 to communicate, via a low-cost linkup such as telephone, back with the transmitting station 144. As shown in fathom, a connection 180 can be made back to a modem 182 which is connected to the source CPU 142. Again, the telephone linkup has a limited throughput due to the limited bandwidth of existing telephone and modem data connections. While an ISDN connection will provide higher throughputs, the telephone connection provides a low-level data dialog—as compared to satellite transmission rates—between the receiver station and the transmitting station. This allows the receiving station to provide feedback to the transmitting station and further direct data transmission, as needed.

The internet would also provide a useful low-cost feedback connection due to the low-cost of gaining online access. Most internet providers now offer fixed rates as low as $15–20 per month for unlimited usage. Such a data connection might prove to be more cost effective than eve a telephone linkup if the throughput levels of data were found to be acceptable for the user's purposes.

As mentioned above, any such low-cost linkup is intended to be embodied within the scope of this invention, and the examples presented are not intended to be limit the invention to these particular linking options.

Figure 7:
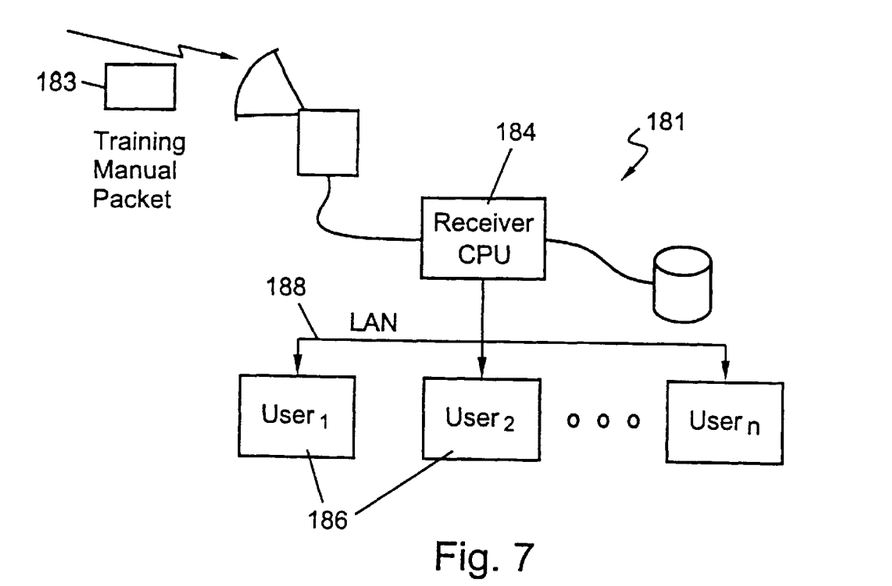
FIG. 7 shows a block diagram of an example training manual packet being received and distributed over a LAN network.

The present invention would also be ideally suited for distributed, or distant, teaching and training facilities. Using the producer software 100 (See FIG. 5), an individual or company could create a training manual which would consist of multiple HTML pages with links in the appropriate spots to video, audio, and textual information. Accordingly, a company could create and update one version of a particular training manual and periodically send it out to sites across the world. Each site could receive its own training manual packet 183 and allow training to occur directly from the receiver CPU 28, 30 (See FIG. 1). Alternatively, as shown in FIG. 7, a receiving station 181 could receive the manual and distribute access to the receiver CPU 184 an LAN connection 188 to multiple users 186.

The training manual or training course would likely consist of a large volume of information which spans many HTML pages and links together numerous graphical, audio, and video files. The manual will also likely have different paths which a user can follow through the complex link of mixed-media information. As a result, it may not be practical to group together and send the entire manual as an IA group or packet. Instead, the manual would be produced in smaller IA groups or packets. The telephone linkup 180, as shown in FIG. 6, could then be used to request the next set of information as it becomes needed by the user. This would prevent the costly transmission of information which the user may not need, or even desire.

Figure 8:
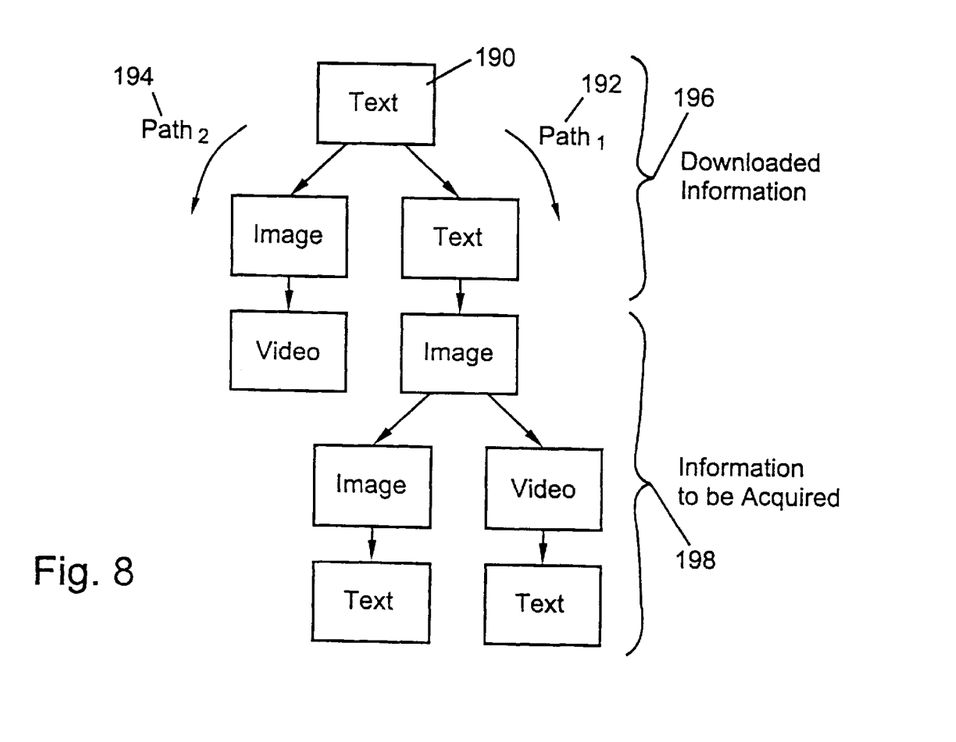
FIG. 8 shows a block diagram of a training manual IA group with a first and second path for training information.

Referring also to FIG. 8, a block diagram of a portion of an example training manual or IA grouping is shown. From the initial text 190, the manual breaks off into a first path 192 and a second path 194. The already transmitted and acquired information might include the portion 196. If the user follows the first path 192, then a need exists for the remaining information 198 as the user proceeds. Accordingly, the telephone linkup 180, as discussed above, could be used to request a transmission to the receiving station of the information to be acquired 198.

Similarly, other remote teaching systems might use the present system. For instance, a teacher or professor in a central location could send IA groups to multiple teaching facilities. The grouping might include video clips and audio clips about the topic of discussion which could be played, and replayed, by each receiving site. The telephone linkup back to the transmitting site could then provide low-level feedback from students, such as textual questions and the link, whereby the teacher would then respond to the question. The answer might come through the same telephone linkup, or the teacher might feel the need to direct an answer to the entire collection of receiving sites.

As discussed above, any type of information can be grouped and organized together into the IA grouping. Such information might include actual programs or computer software to be run by the receiving CPU. One convenient way of sending such programs is through JAVA programs which are placed inside the HTML page code. JAVA programs thereby allow the HTML page to run programs while being displayed to the user. This allows moving graphical patterns and the like to be used to enhance the HTML page. In the teaching example above, this would allow a physics professor to send a program to show and perform a simulation between, for instance, two physical objects.

Numerous modifications may be made to the foregoing system without departing from the basic teachings thereof Although the present invention has been described in substantial detail with reference to one or more specific embodiments, those of skill in the art will recognize that changes may be made thereto without departing from the scope and spirit of the invention as set forth in the appended claims.

What is claimed is:

1. A media distribution network system comprising:
   a producer station maintaining and transmitting to one or more remote receiving stations an envelope of aggregate data, the envelope of aggregate data including a plurality of media files selected from the group consisting of at least two or more among an audio file, a text or graphic file, and a video file, the envelope of aggregate data further including a mark-up language document having a plurality of tags each respectively associated with at least one of the media files;
   a transmission system connected to the producer station and the remote receiving stations, the transmission system broadcasting the envelope of aggregate data from the producer station to one or more remote receiver stations;
   a plurality of remote receiving stations then receiving the envelope of aggregate data from the producer station and transmission system and locally store the envelope of aggregate data in a respective local storage medium associated with each such receiving station, each of the plurality of receiving stations including means for accessing the mark-up language document, the mark-up language document providing means for accessing selective ones of the plurality of media files via a plurality of tags, so that at least one of such receiving stations receives the envelope of data and accesses or plays selective media files by opening the envelope and activating one or more of its associated tags.

2. A media distribution network system as claimed in claim 1 wherein the envelope of aggregate data is transmitted to the receiving station by e-mail and accessed by opening the e-mail.

3. A media distribution network system as claimed in claim 1 wherein the envelope of aggregate data is transmitted to the receiving station by e-mail and accessed by opening the e-mail and wherein the plurality of media files comprises text and at least a plurality of audio or video files and the plurality of tags includes at least one tag associated with at least one such audio or video file, activation of the tag resulting in audio play of the associated audio or video file.

4. A media distribution network system as claimed in claim 1 wherein the transmission system includes a one-way link adapted to transmit the envelope of aggregate data from the producer station to one or more remote receiving stations.

5. A media distribution network system as claimed in claim 2 wherein the mark-up language document further comprises a tag for accessing a telecommunications link and the plurality of media files includes textual information associated with at least one of an audio or video file included in the plurality of media files.

6. A media distribution network system as claimed in claim 1 wherein the mark-up language document further comprises a tag for requesting a further mark-up language document or media file over a telecommunications link.

7. A media distribution network system as claimed in claim 1 wherein the mark-up language document includes, or includes a tag to, indicia describing content of the one or more media files.

8. A media distribution network system as claimed in claim 1 wherein the mark-up language document includes, or includes a tag to, an automatically displayed company logo or trade identity identification or source of origin for data or files associated with the mark-up language document.

9. A transmitter system for use in transmitting an envelope of aggregate data to a remote receiving station for local storage by the receiving station, the transmitter comprising:
   a computer system maintaining and storing the envelope of data, the envelope of aggregate data including a plurality of media files selected from the group consisting of at least two among an audio file, a text or graphic file, and a video file, the envelope of aggregate data further including a mark-up language document having a plurality of tags each respectively associated with at least one of the media files;
   an RF transmitter to which the computer system provides the envelope of aggregate data as output, said RF transmitter modulating the envelope of data for RF transmission of the envelope of data to a remote receiving station so that the receiving station accesses or plays the selected media files by opening the envelope, accessing the mark-up language document, and activating one or more of its associated tags and thereby accessing one or more media files respectively associated with said one or more tags.

10. A transmitter system as claimed in claim 9 wherein the envelope of aggregate data may be transmitted to the receiving station as e-mail and accessed by opening the e-mail.

11. A transmitter system as claimed in claim 9 wherein the envelope of aggregate data may be transmitted to the receiving station as e-mail and accessed by opening the e-mail and wherein the plurality of media files comprises at least a plurality of audio or video files and the plurality of tags comprises at least one tag associated with at least one such audio or video file, activation of the tag resulting in audio play of the associated audio or video file.

12. A transmitter system as claimed in claim 9 wherein the RF transmitter includes a one-way telecommunications link.

13. A transmitter system as claimed in claim 10 wherein the mark-up language document further comprises a tag for accessing a telecommunications link and the plurality of files includes text associated with at least one of the audio or video files included in the plurality of media files.

14. A transmitter system as claimed in claim 13 wherein: (i) the RF transmitter includes a one-way extra-terrestrial link; and (ii) the mark-up language document further comprises a tag for requesting a further mark-up language document over the telecommunications link.

15. A transmitter system as claimed in claim 9 wherein the mark-up language document includes, or includes a tag to, indicia describing content of one or more media files.

16. A transmitter system as claimed in claim 14 wherein the mark-up language document includes, or includes: (i) indicia describing content of one or more media files; and (ii) a company logo or identification of source of origin of data in the envelope.

17. A receiver system for receiving an envelope of aggregate data that has been modulated to RF, the receiver system comprising:
an RF demodulator for demodulating an envelope of aggregate data including a plurality of media files selected from among a group consisting of one or more audio or video files and at least one graphic or text file, the envelope of aggregate data further including a mark-up language document having at least one tag associated with each said media files the demodulator outputting the envelope of aggregate data;
a computer system receiving the envelope of aggregate data from the RF demodulator and locally storing the envelope of aggregate data,, the computer system accessing the plurality of media files via the one or more tags of the mark-up language document and thereby accessing or playing a selected media file by activating the respective tag associated with such selected media file.

18. A receiver system as claimed in claim 17 wherein the plurality of media files comprises multiple audio or video files and the mark-up document includes a plurality of tags, each such tags being associated with one such audio or video file, activation of such tag resulting in play of the associated audio or video file.

19. A receiver system as claimed in claim 18 wherein the plurality of media files comprises at least one video file and the plurality of tags comprises at least one tag associated with at least one video file, activation of the tag resulting in video play of the video file.

20. A receiver system as claimed in claim 17 also including a receiver apparatus connected to the RF demodulator, the receiver being adapted to received the envelope of aggregate data within a one-way RF transmission and forward the received envelope of aggregate data to the RF demodulator.

21. A receiver system as claimed in claim 20 wherein the mark-up language document further comprises a tag for accessing a telecommunications link in order to procure further media files.

22. A receiver system as claimed in claim 21 wherein the mark-up language document further comprises a tag for requesting a further mark-up language document or media file over the telecommunications link.

23. A receiver system as claimed in claim 18 wherein the mark-up language document includes, or includes a tag to, indicia describing content of one or more media files identified in the document.

24. A receiver system as claimed in claim 20 wherein the mark-up language document includes, or includes a tag to, a company logo or source identifying information.

25. A multimedia data transmission system comprising:
a producer server providing output to a wireless transmitter and thereby transmitting an RF modulated envelope of aggregate data having a plurality of RF modulated data elements, the plurality of RF modulated data elements including:
a plurality of media files preselected from a group to consist of at least an audio file or a video file and a text file, and
a mark-up language document having a plurality of tags each respectively associated with at least one of the plurality of media files associated with said envelope;
a receiver demodulator receiving the modulated envelope of aggregate data and demodulating the envelope of aggregate data in order to output the envelope of aggregate data to a receiving computer station; and
said receiving computer station receiving the envelope of aggregate data from said demodulator in order to simultaneously display said document and said graphic or logo so that the user of said receiving computer station accesses or plays said at least one audio or video file by activation of the associated tag in said document.

26. A multimedia data transmission system as claimed in claim 25 wherein: (i) the plurality of media files includes multiple audio or video files, and (ii) the text file includes instructive information for use in connection with activating or playing of the multiple audio of video files.

27. A multimedia data transmission system as claimed in claim 26 wherein the mark-up language document further comprises a tag for accessing a telecommunications link.

28. A multimedia data transmission system as claimed in claim 27 wherein the mark-up language document further comprises a tag for requesting a further mark-up language document over the telecommunications link.

29. A multimedia data transmission system as claimed in claim 25 wherein the mark-up language document includes indicia, or a tag to indicia, describing content of one or more of said media files.

30. A multimedia data transmission system as claimed in claim 25 wherein the mark-up language document includes, or includes a tag to, an identifying graphic or logo.

31. A media distribution system of the type useable to send e-mail from a producer station to multiple remote receiving stations, the system comprising in combination:
a producer station for assembling and simultaneously transmitting to multiple receiving stations a predetermined envelope of aggregate data, the predetermined envelope of aggregate data including a plurality of media files preselected from the group consisting of one or more audio or video files and a text or graphic file, the envelope of aggregate data further including a mark-up language document having at least one tag associated with at least one of such audio or video files among the plurality of media files;
a receiving station receiving the envelope, the receiving station locally storing the media files in a respective local storage medium, the receiving station including means for accessing the mark-up language document and thereby accessing a selective one of the plurality of media files via the tag.

32. A media distribution system as claimed in claim 31 wherein the plurality of media files comprises at least two audio files and at least two tags, each of said two tags being associated with one of said two audio files, activation of each such tag resulting in audio play of the associated audio file.

33. A media distribution system as claimed in claim 31 wherein the plurality of media files comprises multiple video files and the at least one tag is associated with the at least one video file, activation of the tag resulting in play of the video file.

34. A media distribution system as claimed in claim 31 wherein the mark-up language document is formatted as an HTML document and the system further includes a one-way RF link connecting the producer and receiving stations.

35. A media distribution system as claimed in claim 31 wherein the mark-up language document further comprises a tag for accessing a two-way telecommunications link.

36. A media distribution system as claimed in claim 35 wherein the mark-up language document further comprises a tag for requesting a further mark-up language or media file document over the telecommunications link.

37. A media distribution system as claimed in claim 31 wherein the mark-up language document includes, or includes a tag to, indicia describing content of one or more said media files.

38. A media distribution system as claimed in claim 31 wherein the mark-up language document includes, or includes a tag to, a company logo or source identifying indicia.

39. The media distribution network system of claim 3 wherein the transmission system includes a one-way link adapted to transmit the envelope from the producer station to one or more remote receiving stations.

40. The media distribution network system of claim 4 wherein: (i) the one-way link includes an extra-terrestrial satellite; (ii) the producer station includes a document organizing program by which a user may organize the media files; and (iii) a receiving station program on the remote receiving stations for display or playback according to the organization provided by the document organizing program on the producer station.

41. The media distribution network system of claim 39 wherein: (i) the one-way link includes an extra-terrestrial satellite; (ii) the producer station includes a document organizing program by which a user may organize the media files; and (iii) a receiving station program on the remote receiving stations for display or playback according to the organization provided by the document organizing program on the producer station.

42. A media distribution network system as claimed in claim 4 wherein: (i) the receiving station includes a telecommunications link to the producer station or another content site; and (ii) the markup language document further comprises a tag for requesting a further mark-up language document or media file over the telecommunications link.

43. A media distribution network system as claimed in claim 39 wherein: (i) the receiving station includes a telecommunications link to the producer station or another content site; and (ii) the mark-up language document further comprises a tag for requesting a further mark-up language document or media file over the telecommunications link.

44. A media distribution network system as claimed in claim 40 wherein: (i) the receiving station includes a telecommunications link to the producer station or another content site; and (ii) the mark-up language document further comprises a tag for requesting a further mark-up language document or media file over the telecommunications link.

45. A media distribution network system as claimed in claim 41 wherein: (i) the receiving station includes a telecommunications link to the producer station or another content site; and (ii) the mark-up language document further comprises a tag for requesting a further mark-up language document or media file over the telecommunications link.

46. A media distribution network system as claimed in claim 4 wherein the mark-up language document includes, or includes a tag to, a company logo or trade identity identification of a source of origin for data provided by the mark-up language document.

47. A media distribution network system as claimed in claim 39 wherein the mark-up language document includes, or includes a tag to, a company logo or trade identity identification of a source of origin for data provided by the mark-up language document.

48. A media distribution network system as claimed in claim 42 wherein the mark-up language document includes, or includes a tag to, a company logo or trade identity identification of a source of origin for data provided by the mark-up language document.

49. A media distribution network system as claimed in claim 45 wherein the mark-up language document includes, or includes a tag to, a company logo or trade identity identification of a source of origin for data provided by the mark-up language document.

50. A media distribution network system as claimed in claim 46 wherein the mark-up language document includes, or includes a tag to, a company logo or trade identity identification of a source of origin for data provided by the mark-up language document.

* * * * *